United States Patent
Bhatti et al.

(10) Patent No.: US 7,885,244 B2
(45) Date of Patent: *Feb. 8, 2011

(54) HYBRID MULTIPLE ACCESS METHOD AND SYSTEM IN WIRELESS NETWORKS WITH EXTENDED CONTENT FREE ACCESS PERIOD

(75) Inventors: Ghulam Bhatti, Mansfield, MA (US); Zafer Sahinoglu, Arlington, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/345,211

(22) Filed: Dec. 29, 2008

(65) Prior Publication Data

US 2009/0238160 A1 Sep. 24, 2009

Related U.S. Application Data

(60) Provisional application No. 61/037,395, filed on Mar. 18, 2008.

(51) Int. Cl.
*H04W 4/00* (2009.01)

(52) U.S. Cl. .................. 370/338; 370/330; 370/336; 370/280; 370/410; 370/447

(58) Field of Classification Search .............. 370/330, 370/338, 336, 230, 280, 410, 447, 442; 455/456.1
See application file for complete search history.

(56) References Cited

U.S. PATENT DOCUMENTS

| | | | |
|---|---|---|---|
| 2006/0050730 A1* | 3/2006 | Shvodian | 370/458 |
| 2008/0253328 A1* | 10/2008 | Sahinoglu et al. | 370/330 |

\* cited by examiner

*Primary Examiner*—Pierre-Louis Desir
(74) *Attorney, Agent, or Firm*—Dirk Brinkman; Gene Vinokur

(57) ABSTRACT

A method for communicating in a network including a coordinator node and a set of leaf nodes transmits periodically, from the coordinator node to the set of leaf nodes, a beacon defining a superframe, wherein the supper frame includes an active period and an inactive period, and wherein the active period includes a first contention access period (CAP-1), a first contention free period (CFP-1), a first group acknowledgement (GACK-1), a second CFP-2, a second GACK-2, and a second CAP-2, and wherein each CFP includes a guaranteed time slot (GTS) assigned to each leaf node. Then, each leaf node transmits to the coordinator node only during the GTS assigned to the leaf node during each CFP.

7 Claims, 13 Drawing Sheets

HYBRID MULTIPLE ACCESS METHOD AND SYSTEM IN WIRELESS NETWORKS WITH EXTENDED CONTENT FREE ACCESS PERIOD

RELATED APPLICATION

This Non-Provisional Application claims priority to U.S. Provisional Application 61/037,395, "Hybrid Multiple Access Method and System in Wireless Networks with Extended Content Free Access Period," filed by Sahinoglu et al., on Mar. 18, 2008, and incorporated herein by reference.

FIELD OF THE INVENTION

This invention relates generally to wireless communications, and more particularly to channel access and scheduling of transmissions in an ad-hoc network of low power transceivers.

BACKGROUND OF THE INVENTION

Media access control (MAC) attempt to avoid collisions in wireless communication networks. Typically, the MAC specifies, schedules and manages concurrent transmissions of multiple wireless devices or nodes.

A number of MACs are known, including carrier sense multiple access (CSMA), time division multiple access (TDMA), code division multiple access (CDMA), and frequency hopping (FH). Hybrid MAC uses use a combination of CSMA, TDMA and FH.

Lower layers of such a network are specified by the IEEE 802.15.4 standard. The standard specifies the physical layer and media access control for low-rate wireless personal area networks (LR-WPANs). It is the bases for ZigBee, Bluetooth, WirelessHART, and MiWi specifications. The network can include master coordinator and slave leaf nodes in a cluster-tree like network topology.

The standard defines two types of network nodes. A full-function device (FFD) serves as a coordinator node of the personal area network, and a reduced-function devices (RFD) or leaf node has very modest resource and communication requirements.

FIG. 1 shows a superframe 160 according to the EEE 802.15.4 standard. The horizontal axis 105 indicates time. Each coordinator in the network periodically transmits a beacon 100. The beacon is used for synchronization and resource allocation. An interval between two consecutive beacons is a beacon interval 120 or cycle time.

The superframe includes a contention access period (CAP) 150 that uses CSMA, followed by a contention free period (CFP) that uses TDMA. The CFP 140 includes guaranteed time slots (GTS) 145. Each time slots 145 is allocated to a network device (node) that requires contention free access to the channel to minimize probability of collision of its transmission with other transmissions. Typically, the CFP is used for more important traffic that must get though in time.

The CAP 150 and the CFP 140 form the active portion 110 of the superframe 160, which is followed by a much longer inactive period 130. The inactive period can be used by other coordinators, while the coordinator node of this superframe is idle and 'listens' to the channel for transmissions by the other coordinators. A child coordinator 11 can start its superframe 170 during the inactive portion 130 of the superframe 160 of its parent coordinator 102. A leaf node communicates with its parent coordinator only during the active portion 110 of the superframe 160 of its parent coordinator 10. The inactive period can be several seconds.

There are several problems with the above design.

First, the active period begins with the CAP. During the CAP, transmissions are more likely to collide than during the CFP. If a transmission of a node collides with the transmission of another node, then a retransmission is necessary. In this case, the node continues to compete with other nodes for channel access to retransmit during the CAP 150. If the retransmissions continue to fails during the CAP, then the node has to wait until the next superframe to complete the transmission. This increases latency in the network, and tends to push traffic later out in time.

Second, it is also possible that transmission during the CFP can fail, for example, due to fast fading, attenuation, multi-path distortion and frequency mismatch. In these cases, retransmissions will have to wait for the CAP in the next superframe, which increases latency for the more important on-demand traffic. A GTS in the current superframe could be reassigned to a failed message, however, this decreases throughput for priority traffic.

Third, acknowledgements (or not) of successful transmissions are handled on a per GTS basis. That is, after each GTS is received, the receiver must switch to transmit mode to send the ACK, and the transmitter much switch to receive mode to receive the ACK and then switch back to transmit mode again for the next GTS. Switching modes takes time, consumes scarce power resources, increases latency and reduces throughput.

Fourth, the information in the beacon is time sensitive. This means that as time passes, the resource allocation made at the beginning of the superframe is less likely to be good as time passes. This is particularly true for frequency assignments. Thus, the reliability of the information for the important and later CFP traffic is less than the reliability of the incidental earlier traffic during the earlier CAP.

Fifth, the periodicity of the beacons is relatively low, e.g., a beacon every couple of seconds. This impacts the ability of nodes to synchronize and allocate resources. If a node misses a beacon, then it has to wait a relatively long time for the next beacon.

Sixth, the frequency allocations during the active interval are fixed. It is known that wireless communications are frequency sensitive. Fixed frequency allocations are less desirable.

Seventh, the current standard does not specify when child coordinators can start their superframe during the inactive period. The inactive interval essentially uses contention based access. This increases the likelihood of collisions between superframes of child nodes, and reduces the overall performance of the network.

FIG. 2 shows the frame structure for another hybrid channel access method with a beacon interval 220 between beacons 200. A superframe 260 includes a CFP-A 270, followed by a CAP 250 and then followed by a CFP-B 240 and an inactive 230 period, along a timeline 205. The contention access period is frequency hopped. The CFP-A and CFP-B include guaranteed time slots 275 as in the structure of FIG. 1. The TDMA slots are allocated to traffic with repetitive bandwidth requirements, and periodic coordinator beacons. The CAP 250 can be used for retransmissions, unscheduled alerts, and requests for TDMA bandwidths. The CFP-B 240 includes ad-hoc TDMA slots 245. These time slots 245 can be used for unscheduled bandwidth, and high priority on-demand and low latency burst mode traffic. The superframes 260 are scheduled centrally. The TDMA slot allocation within a superframe 260 is managed by the coordinator, which controls the superframe. This structure only partially solves the problems associated with retransmission for the CFP-A. However, all of the other problems persist.

FIG. 3 shows a frame structure for a time synchronized mesh protocol (TSMP) along a time line 305. The TSMP is a packet-based protocol where each transmission contains a single packet, and acknowledgements are replied immediately after a packet has been received. All node-to-node communications using the TSMP are transacted in a specific time slot 320.

A sequence of the time slots 320 comprises a frame 300. The frame length 330 is counted in slots, and is a configurable parameter. A TSMP node can participate in multiple frames at one time for different tasks. The TSMP does not use beacons. For each time slot, frequency hopping is used to reduce interference. The hopping sequence and slots assignments are centrally managed.

This structure solves the long latency retransmission problems associated with the structures of FIGS. 1 and 2. However, this structure requires centralized network management. This means that a local failure at the coordinator node can shut down the entire network. Also, recovery from a failure takes a long time.

SUMMARY OF THE INVENTION

A method and system access a channel in a wireless network of nodes. A coordinator transmits periodically a beacon, in which a time between two consecutive beacons constitute a beacon interval.

The coordinator and leaf nodes transceive a superframe during the beacon interval, in which the superframe begins with an active interval, which is immediately followed by an inactive interval, and in which the active interval begins with a contention free period (CFP), which is immediately followed by a contention access period (CAP), which is immediately followed by the inactive interval.

DETAILED DESCRIPTION OF THE PREFERRED EMBODIMENT

Figure 1:
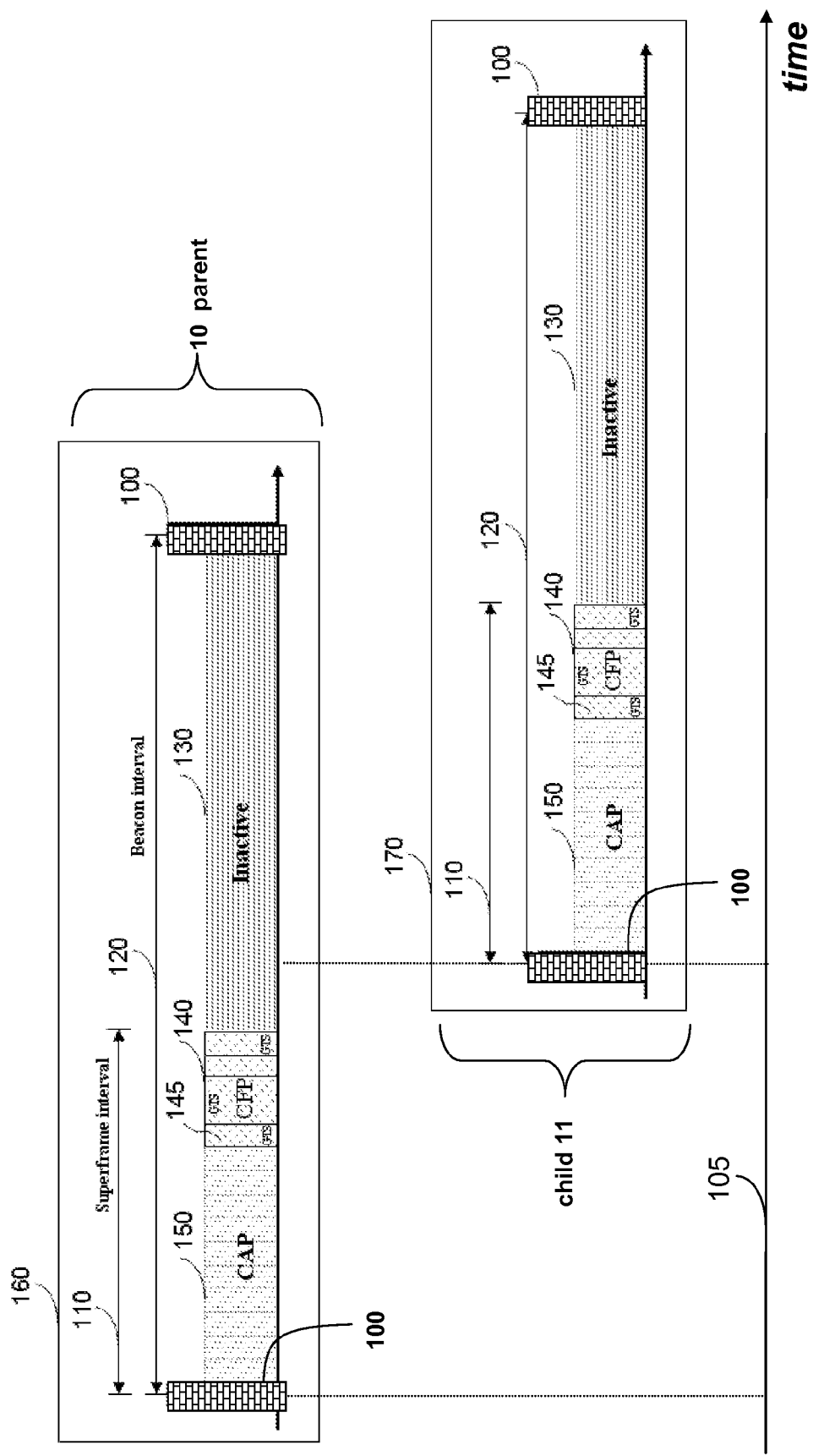
FIGS. 1-3 are block diagrams of prior art superframes.
Figure 2:
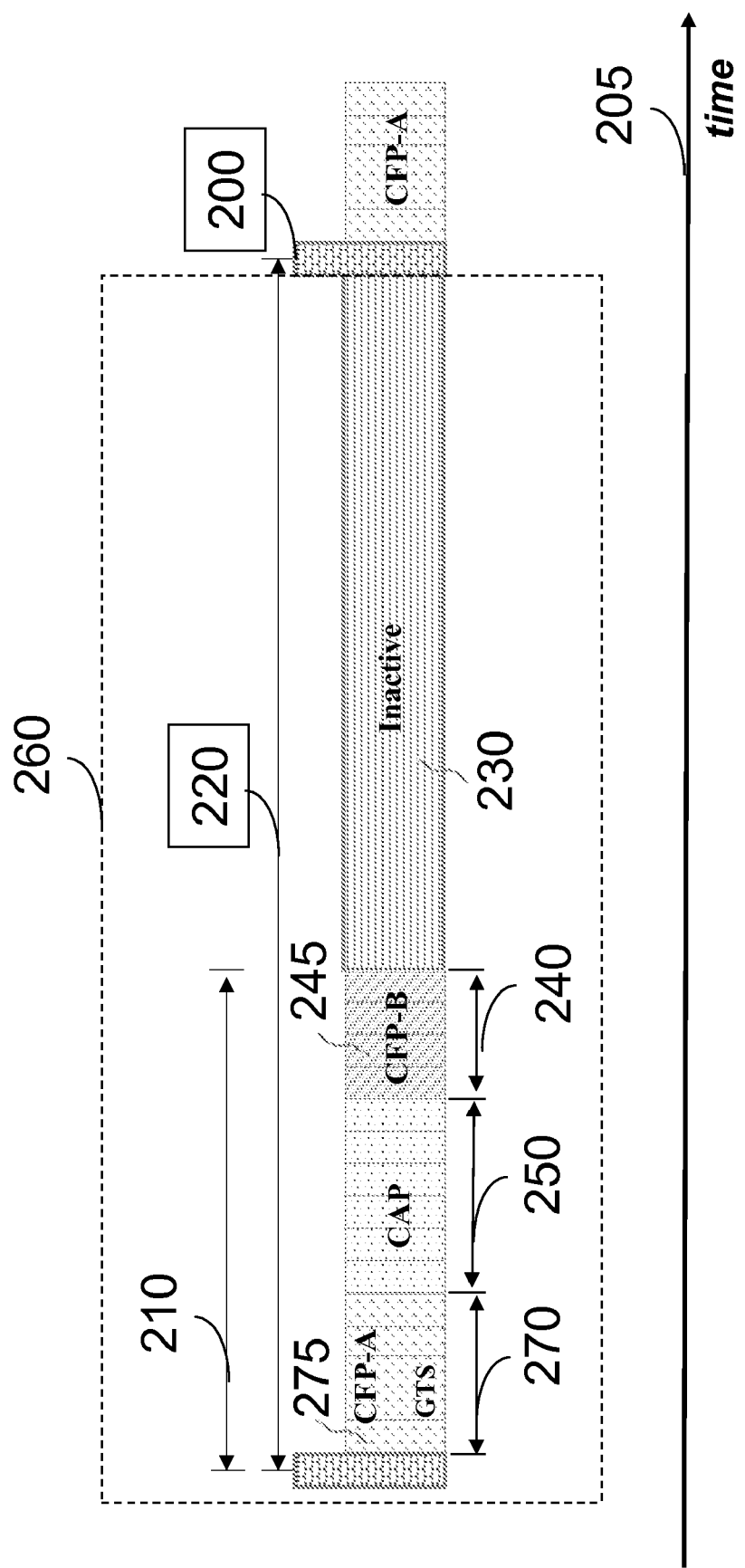
Figure 3:
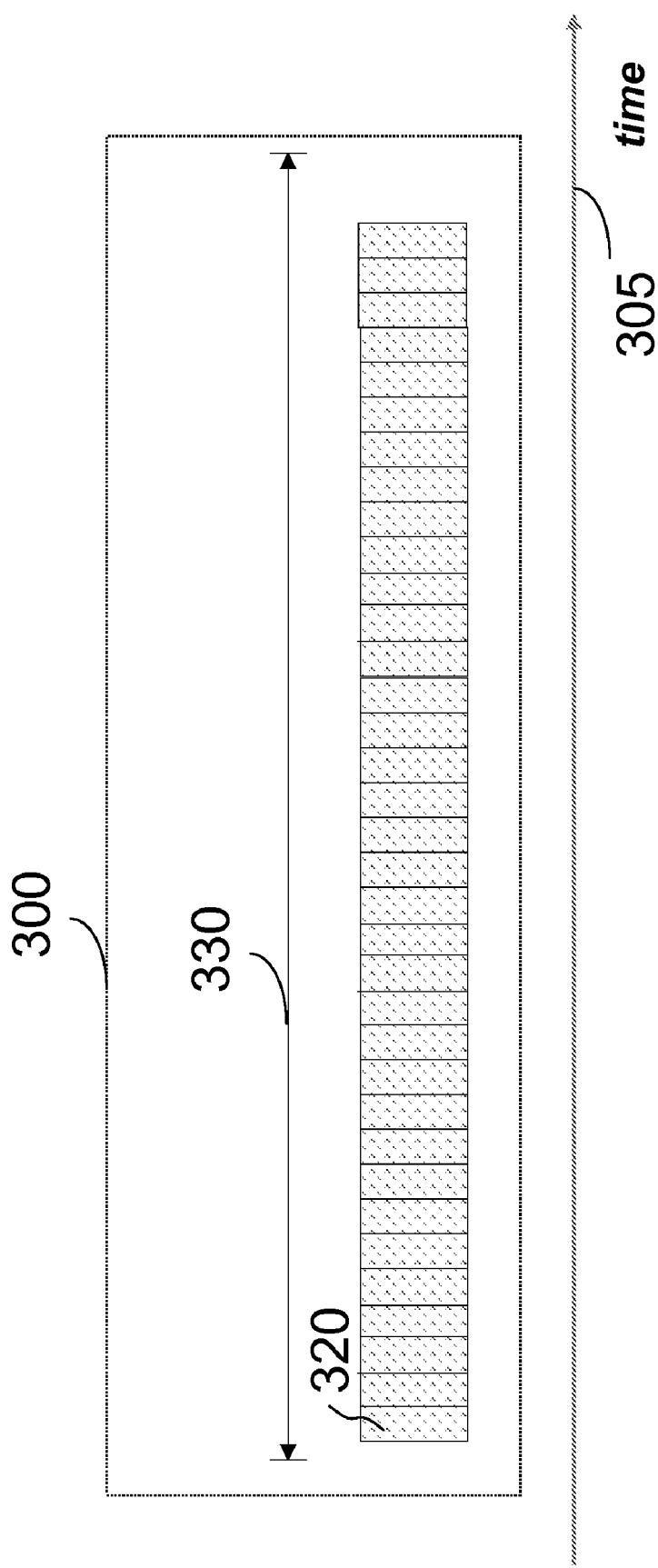
Figure 4A:
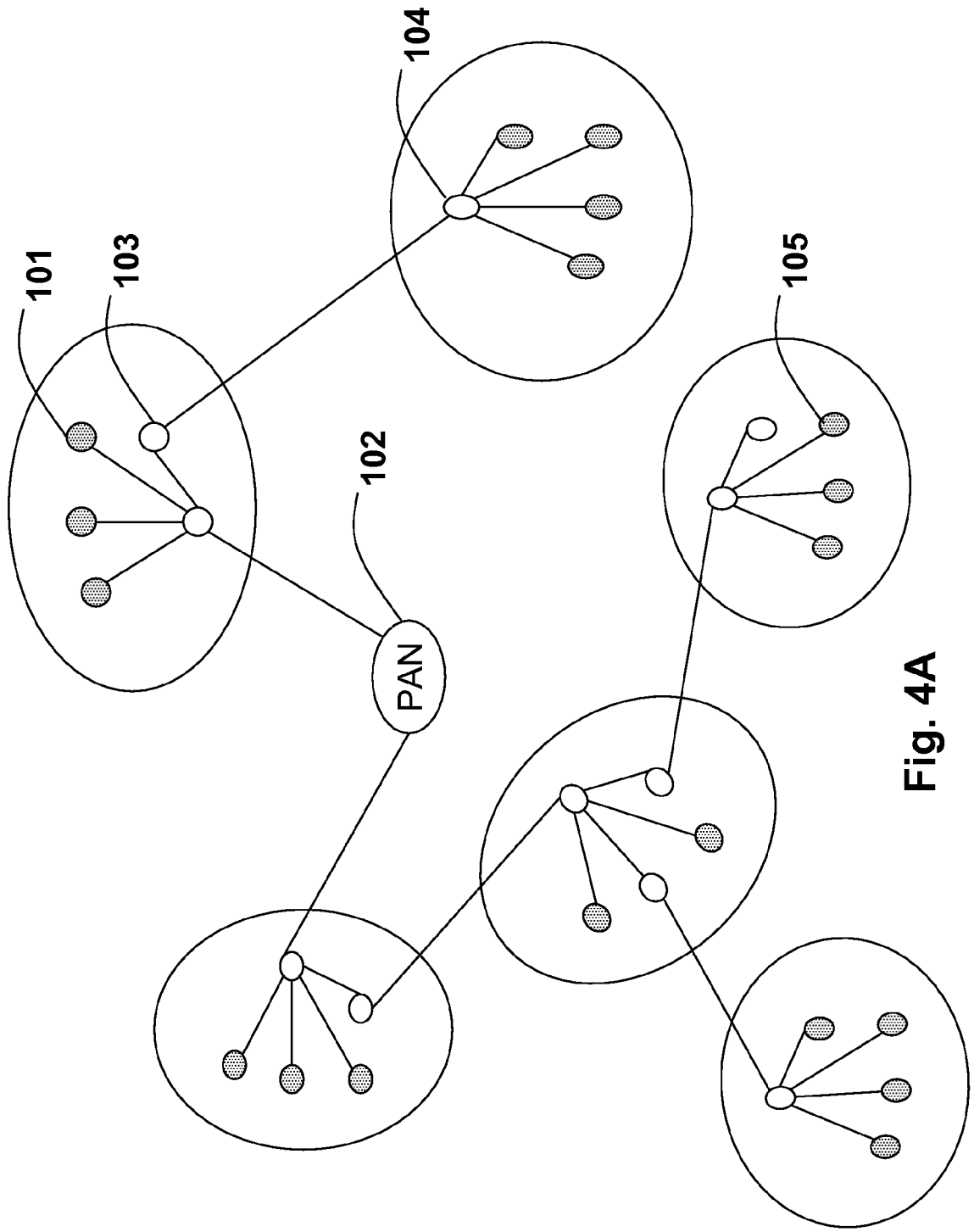
FIG. 4A is a block diagram of a network topology used by embodiments of the invention.

As shown in FIG. 4A, a network used by the embodiments of the invention can be a cluster-tree of nodes (transceiver devices) 101, with a single personal area network (PAN) coordinator 102, parent cluster coordinators 103, child coordinators 104, and leaf nodes 105.

Frame Structure

Figure 4B:
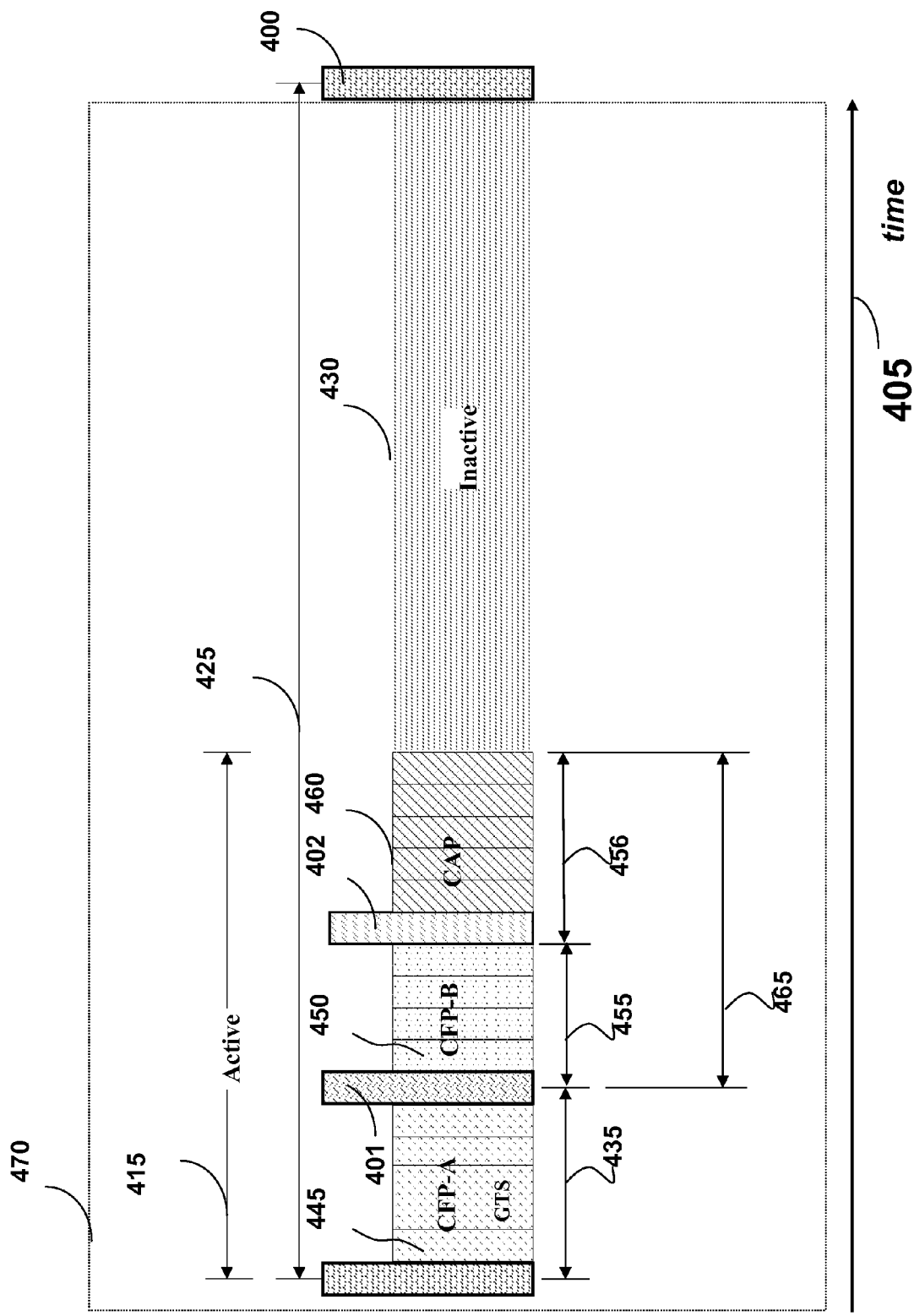
FIG. 4B is a block diagram of a superframe structure according to embodiments of the invention.

FIG. 4B shows a structure of a superframe 470 according to an embodiment of the present invention along a time line 405. The superframe according to the embodiment of the invention reduces power, improves reliability, and supports low latency applications. A hybrid MAC method is also described.

The superframe is synchronized by beacons 400 during a beacon interval 425. Every coordinator node periodically transmits the beacon. The superframe has an active interval 415 and an inactive interval 430. In one embodiment, all the beacons are transmitted at the same channel frequency. In another embodiment, the beacons use frequency hopping (FH).

It should be noted that the time is not to scale in the Figures. The duration of the inactive period (measured in seconds) is much longer than the active period (measured in milliseconds).

The MAC superframe 470 includes guaranteed time division multiple access (TDMA) slots (GTS) 445 during a (first) CFP-A 435, scheduled TDMA time slots 450 for retransmissions during a (second) CFP-B 455, a code division multiple access (CDMA) period (CAP) 460 for latency tolerant transmissions.

Each GTS within the CFP is allocated for transmission of delay sensitive traffic. The coordinator node can allocate more than one GTS to a node. The allocation also indicates the direction of traffic during the GTS, i.e., whether the node is to transmit or receive. Therefore, the nodes transceive during the active interval.

It should also be noted, frequencies (sub-carriers) can be allocated to the GTSs and the CAP on an individual basis, making the entire active interval frequency hopped.

In contrast with the prior art frame structure, the superframe according to the embodiments places the entire contention free period at the beginning of the superframe, followed by the contention access period. This mitigates the first, second, and fourth problems.

For transmissions during the first CFP-A, a (first) group acknowledgment message (GACK) 401 is transmitted at the end of the CFP. The GACK can include an alarm message to indicate that the transmission failed. This addresses the third problem. Each transmission during the conventional CFP is acknowledged individually. Because the invention sends all acknowledgements simultaneously as a group, the node does not need to switch between transmit and receive mode, which reduces power consumption and latency.

The GACK can also serve as an auxiliary beacon for subsequent retransmissions, which improves synchronization and frequency allocation, particularly in fast fading channels. This solves the fourth, fifth and sixth problems.

If a transmission of data during the CFP-A fails, then the data are retransmitted during the second CFP-B, perhaps at a different frequency. The different frequency is indicated by the GACK, to achieve the increase in frequency diversity. The frequency diversity increases the probability of a successful retransmission. It is known that fading, attenuation, collisions, and multi-path distortion are highly frequency sensitive in wireless channels. Therefore, any increase in frequency diversity is advantageous. Also, because the frequency allocations in the GACK are more recent, they are probably more correct than the allocations made in the beacon at the beginning of the superframe.

If the retransmission fails again during the CFP-B, then another attempt can be made during the CAP. A second GACK-2 402 indicates the frequencies to be used during the CAP. The second GACK can also be used for synchronization and updating frequency allocations. Thus, the two GACKs according to the embodiments of the invention greatly improve the overall performance of the network, and solve numerous problems associated with conventional frames.

If all transmissions during the CFP-A are successful, then no retransmission is necessary, and the CAP has a period 465.

MAC Method

The MAC method according to an embodiment of the invention prioritizes low latency traffic. This traffic can have an immediate opportunity for two retransmissions in the superframe when needed. This is made possible by the structure of the superframe as shown in FIG. 4B. If high priority traffic does not require any retransmission, the available bandwidth can be allocated to CSMA transmissions. If a node misses the beacon 400, then the node can recover channel information and synchronize timing using the GACK, or perhaps the GACK-2.

As stated above, the coordinator node transmits the first GACK-1 at the end of the CFP-A, and the second GACK-2 at the end of the CFP-B. The GACKs acknowledges successful receptions (and failures) during the CFP with a bit map. One bit is allocated in the GACKs for each GTS during the CFP. For example, if there are seven GTSs in the CFP, then the GACK include a seven bit map. Each bit in the map indicates whether a message is received or failed within the corresponding GTS. The coordinator manages GTS allocation and deallocation. Therefore, the coordinator knows a priori the structure of the GTS slots and the GACK. If a GTS transmission fails, then the source of the transmission can check the corresponding bit of the map.

Figure 5:
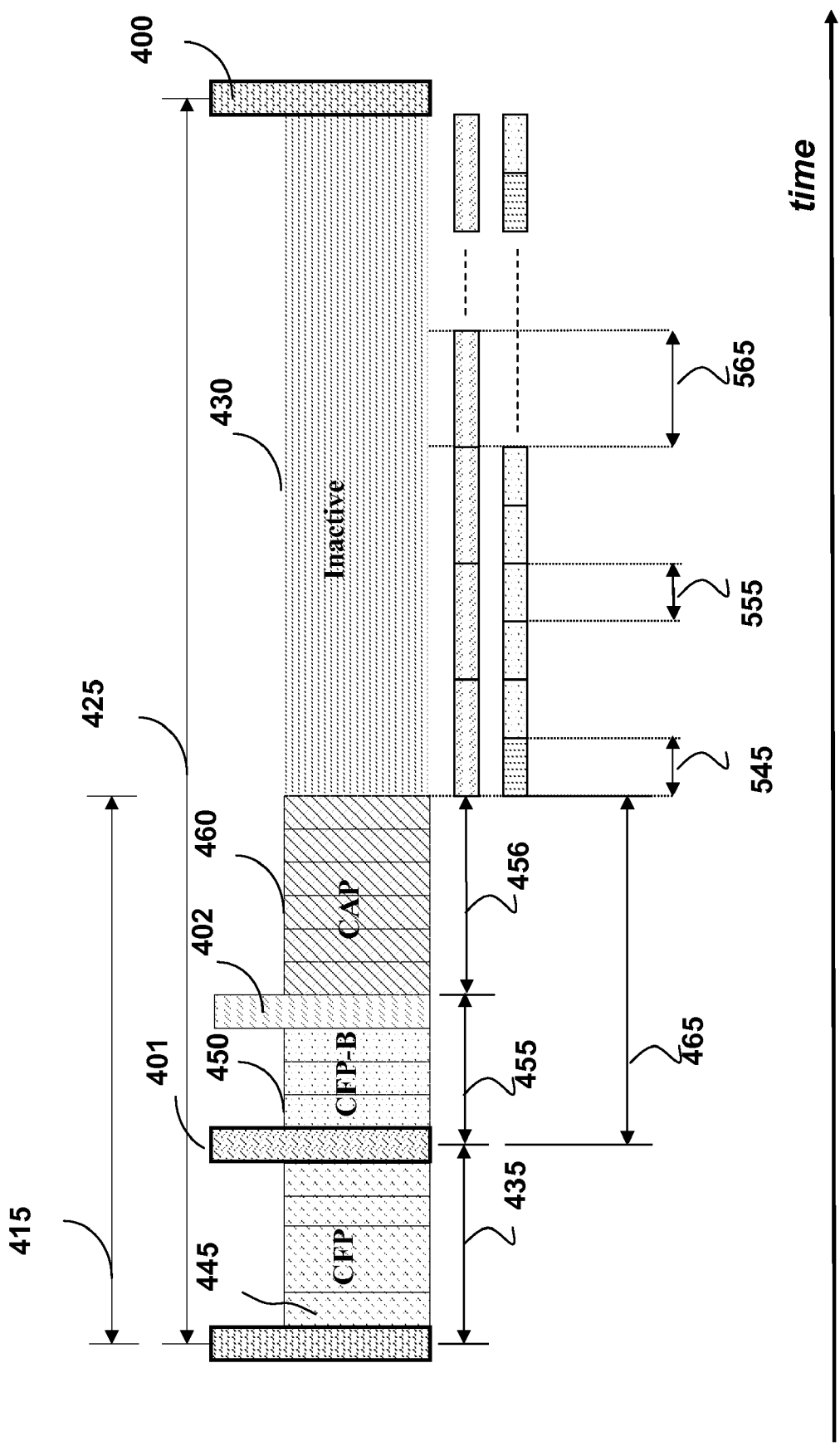
FIG. 5 is a block diagram of time slotting of an inactive portion of the superframe of FIG. 4B.

As shown in FIG. 5, the inactive interval 430 of the superframe 470 according to an embodiment of the invention is partitioned into inactive time slots 565. The number of such slots is a network specified parameter. Each inactive time slot includes a main interval 545 and a guard interval 555. A child coordinator starts transmitting its superframe during the main interval of an available inactive time-slot 565 of the inactive interval of the superframe of its parent coordinator. This makes the inactive time slot unavailable for use by another child coordinator. Thus, according to this embodiment of the invention, the child nodes effectively start superframes in a contention free manner. This solves the seventh problem. The available main intervals can be used up in any order.

Figure 6:
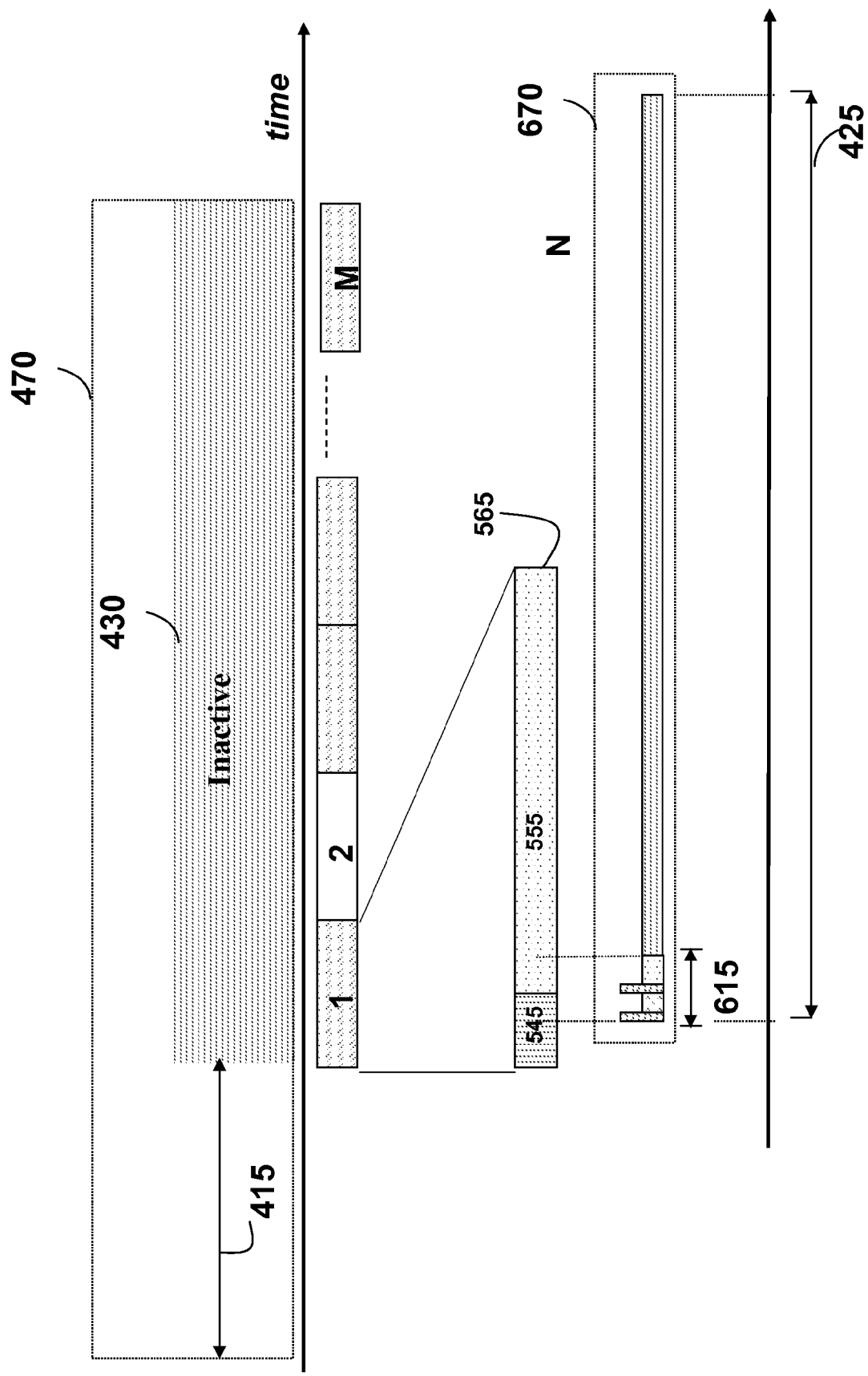
FIG. 6 is a block diagram of relative timing of child and parent superframes according to an embodiment of the invention.

FIG. 6 shows M inactive time slots 564. As shown in FIG. 6, the combined duration of the main and guard intervals is longer than the active period 415 of the superframe 470 to prevent a potential overlap between the active periods 415 of the parent superframe 470 and the active period 615 of the superframe 670 of the child coordinator.

Figure 7:
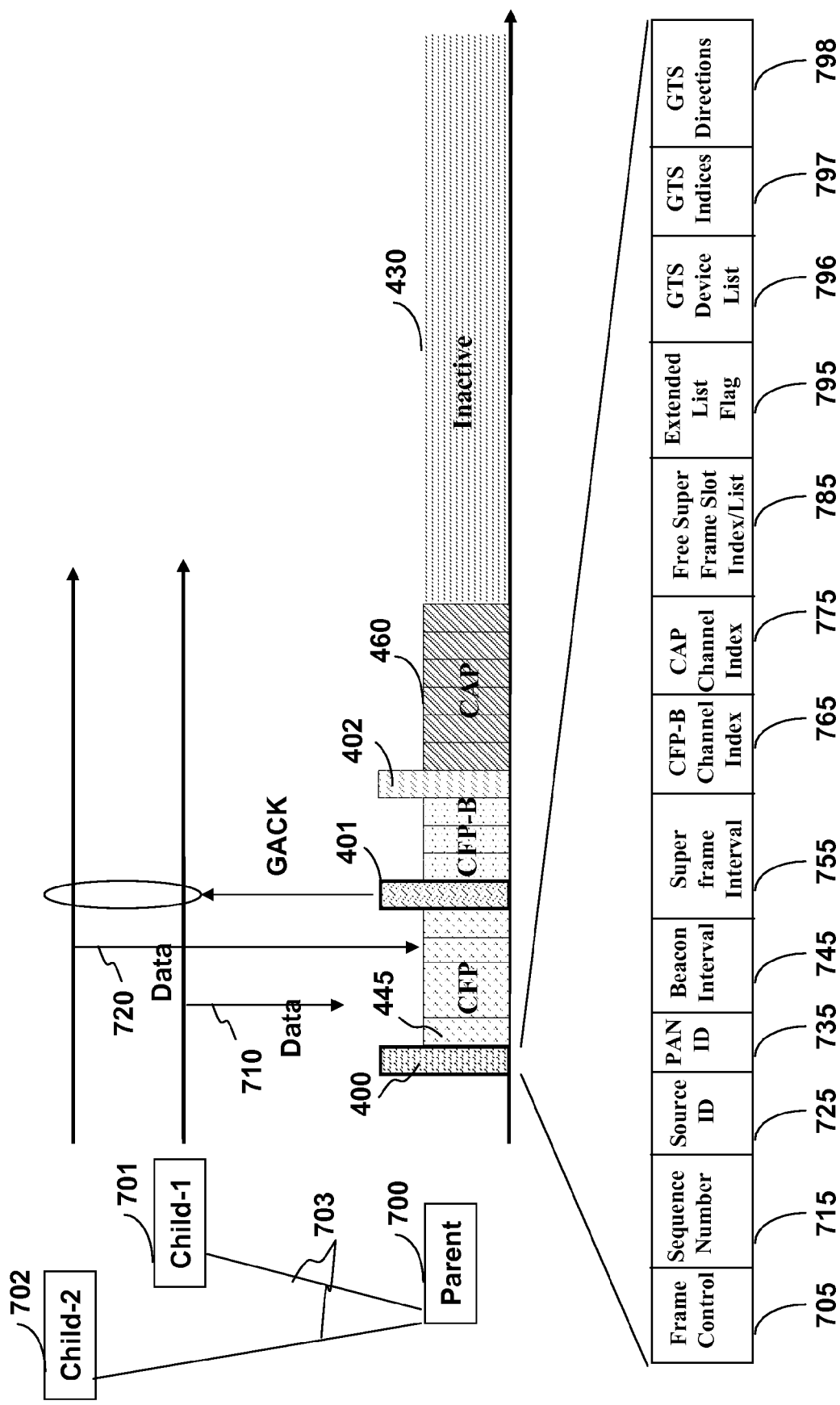
FIG. 7 is a block diagram of a structure of a beacon according to an embodiment of the invention.

FIG. 7 shows transmissions between a parent coordinator 700 and two leaf nodes 701 and 702. The leaf nodes 701 and 702 transmit data (packets) 710 and 720 to the parent coordinator 700 within the CFP 435 of the parent.

The GACK 401 is used to acknowledge the two transmissions 710 and 720. If any of the data transmissions 710 or 720 failed as indicated by an alarm message in the GACK, a retransmission is performed during the CFP-B 455.

Beacon

The beacon 400 according to an embodiment of the invention includes the following fields: Frame Control 705, Sequence Number 715, which uniquely identifies each beacon 400, Source ID 725, which identifies the source node of the beacon 400, e.g., ID of the parent coordinator 700, PAN ID 735, which identifies the network of the source node 700 of the beacon 400, Beacon Interval 745, which indicates the length of the beacon interval 425, Superframe Interval 755, which indicates the length of the superframe interval 415, CFP-B Channel Index 765, which indicates the channel index for the CFP-B period, CAP Channel Index 775, which identifies the channel index for the CAP The Free Superframe Slot/Index List 785 indicates lists available main slots 545 within the inactive period 430 of the superframe 470. This field essentially implements the contention free access during the in active interval 430.

The beacon also includes an Extended List Flag 795, which indicates that continuation of the free superframe slot/index list is given in the GACK, GTS Device List 796, which lists the nodes that have assigned GTSs 445, GTS Indices 797, which lists the GTS index for each assigned node in the same order as the GTS device list 796, and GTS Directions 798, which indicates whether GTSs 445 are for transmit or receive for the nodes in the GTS device list 796.

Figure 8:
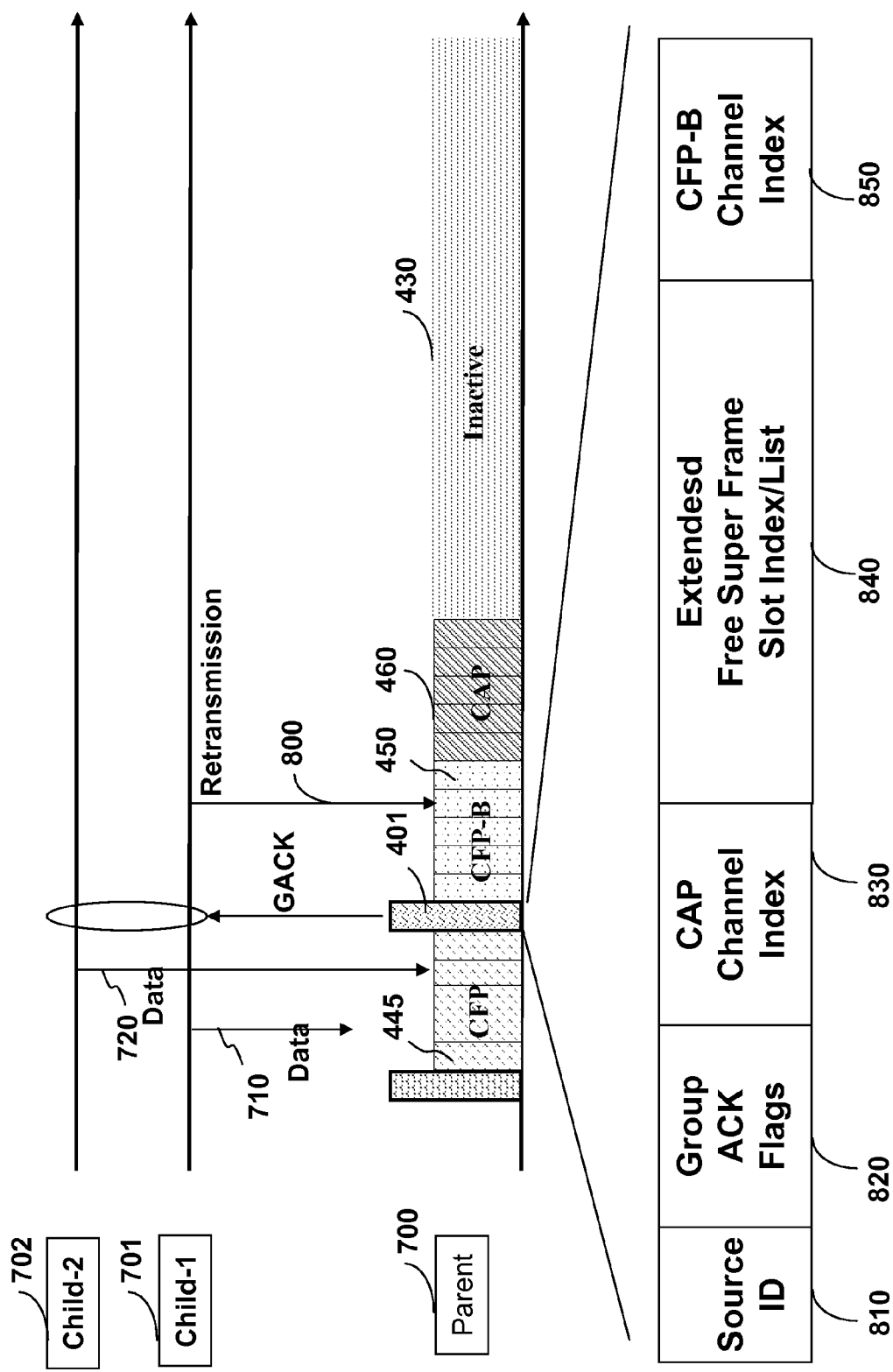
FIG. 8 is a block diagram of a structure of a first group acknowledgment (GACK-1) according to an embodiment of the invention.

FIG. 8 shows the fields of the GACK401: Source ID 810, which identifies the source of the GACK, e.g., the parent coordinator 700, Group ACK Flags 820, which indicate whether transmissions received within corresponding GTSs were successful, CAP Channel Index 830, which indicates the frequency of the channel for the CAP period, Extended Free Superframe Slot Index/List 840, which indicates the continuation of the free super frame slots 785 in the beacon, and the CFP-B Channel Index 850, which indicates the frequency of the channel for the CFP-B 455.

The GACK serves the following purposes. The GACK provides acknowledgment for a group of transmissions during the CFP. The GACK reduces power consumption because the coordinator does not need to switch between transmit and receive modes during each GTS. A node retransmits within the CFP-B 455 using the frequency indicated by the CFP-B channel index 850. This lowers per hop latency and decreases interference. The parent can combine erroneous transmissions from the CFP 435 and the CFP-B 455, and apply a hybrid ARQ scheme, e.g., a chase combining, to decode data. The GACK can also be used for synchronization.

Figure 9:
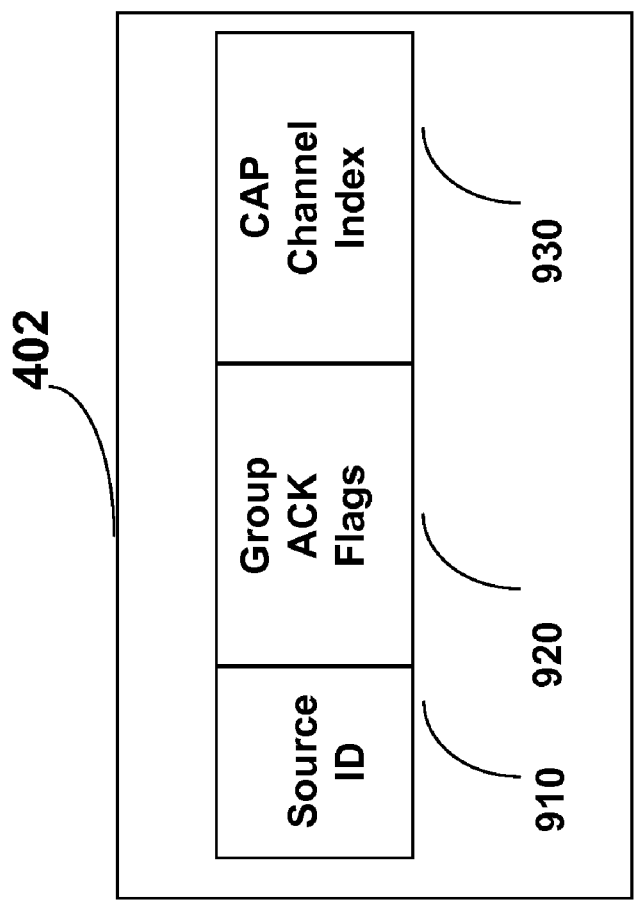
FIG. 9 is a block diagram of a second group acknowledgement (GACK-2) according to an embodiment of the invention.

FIG. 9 shows the content of the GACK-2 402. The GACK-2 includes the following fields: Source ID 910, which identifies the source node of the GACK-2, Group ACK flags 920, which indicates the ACK flags for the retransmissions within the CFP-B 455, and the CAP Channel Index 930, which indicates the index of the channel for the CAP period 456.

Figure 10:
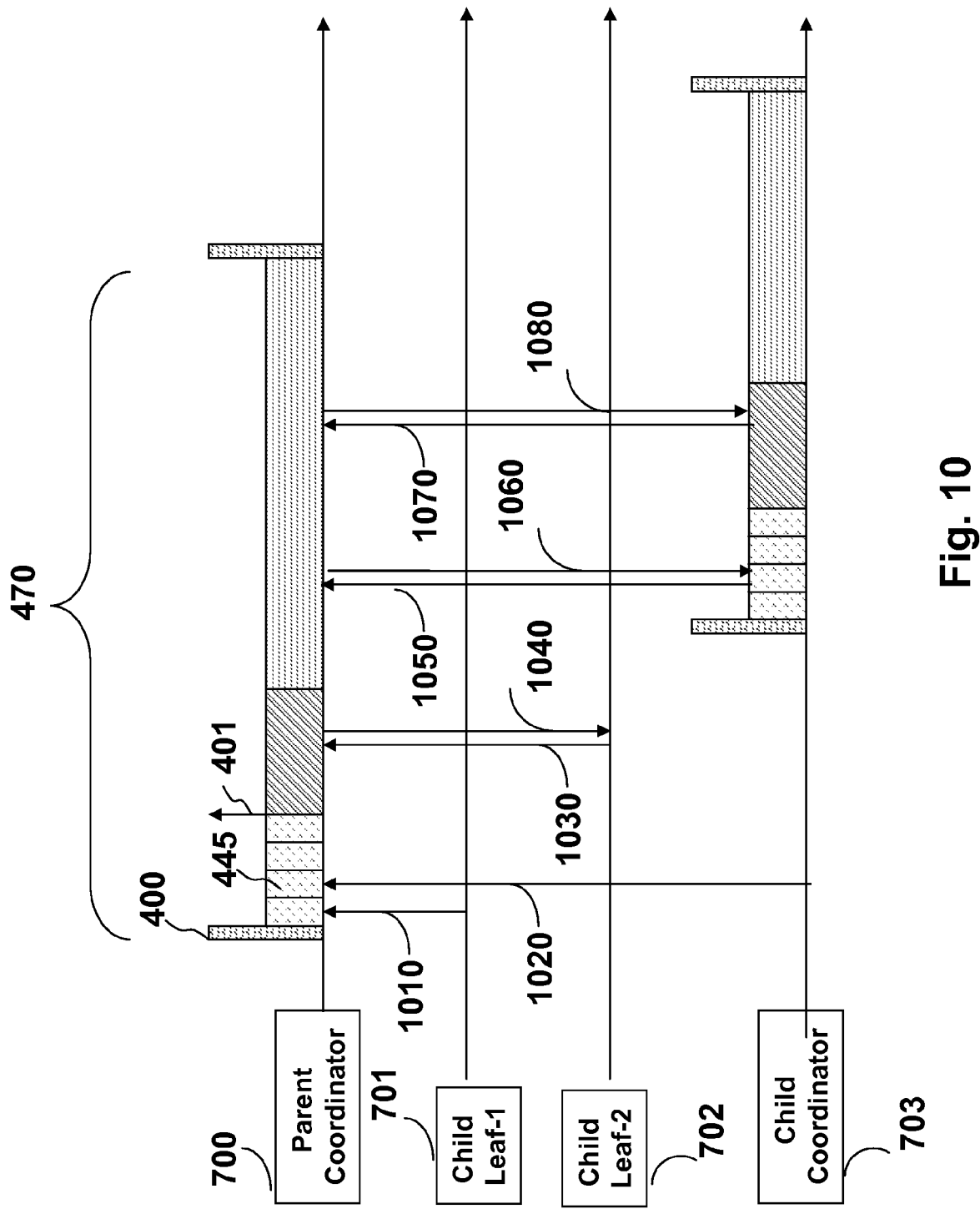
FIG. 10 is a timing diagram of message exchanges between coordinator and leaf nodes according to an embodiment of the invention.

As shown in FIG. 10, a parent coordinator 700 can receive messages from leaf child nodes 701 and 702 during the CFP 435 and the CAP 456 of its own superframe 470. For messages 1010 and 1020 received during the CFP 435, the parent coordinator 700 transmits a single group acknowledgment 401. For a message 1030 received during the CAP 456 of its own superframe 470, the parent coordinator 700 transmits an individual acknowledgment 1040.

If the parent coordinator 700 receives a message 1050 from a child coordinator 703 during the inactive period 430 of its superframe 470, then the parent sends back an acknowledgment 1060. Similarly, if the parent coordinator 700 receives a message 1070 from a child coordinator 703 during the inactive period 430 of its superframe 470 and during the CAP 456 of the child coordinator 703 superframe, then the parent coordinator 700 sends back an acknowledgment 1080.

Superframe with Extended Content Free Access Period

As described above, a superframe according to the IEEE 802.15.4 MAC standard has two parts, called the active period and the inactive period. The active period, in turn, includes (1) a beacon frame, (2) a contention access period (CAP), and (3) a contention free period (CFP). The node communicates with adjacent nodes only during the active period. During the inactive period, a node restrains from transmitting and can switch over to sleep (or low power) mode to save battery power and to avoid interfering communications between other nodes.

All adjacent nodes are allowed to communicate with this node, i.e., the owner of the superframe, by following the CSMA/CA protocol to access the communication channel. No contention is allowed during CFP by pre-allocating specific time slots, called guaranteed time slots (GTS), to requesting nodes. A node communicates during the GTS only if that GTS is allocated to this node.

There are several problems associated with this frame structure. The number of GTS slots is limited (up to seven). If a GTS transmission fails, then re-transmission can only be tried in a next superframe. This introduces a significant delay. Thus, the frame structure fails to satisfy stringent reliability and latency requirements in many applications, such as industrial deployments of wireless sensor networks.

To remedy some of the problems of the IEEE 802.15.4 superframe, we describe a new structure of the superframe that provides multiple chances for retransmission of a failed GTS frame in the current superframe. This decreases latency and increases reliability performance of the system.

However, the structure, as described above, lacks one important property that is thought to be very crucial in the IEEE standards. Specifically, the frame structure above is not backward compatible with other IEEE standards, specifically the IEEE 802.15.4 standard. Hence, we describe a new frame structure that is backward compatible.

Figure 11:
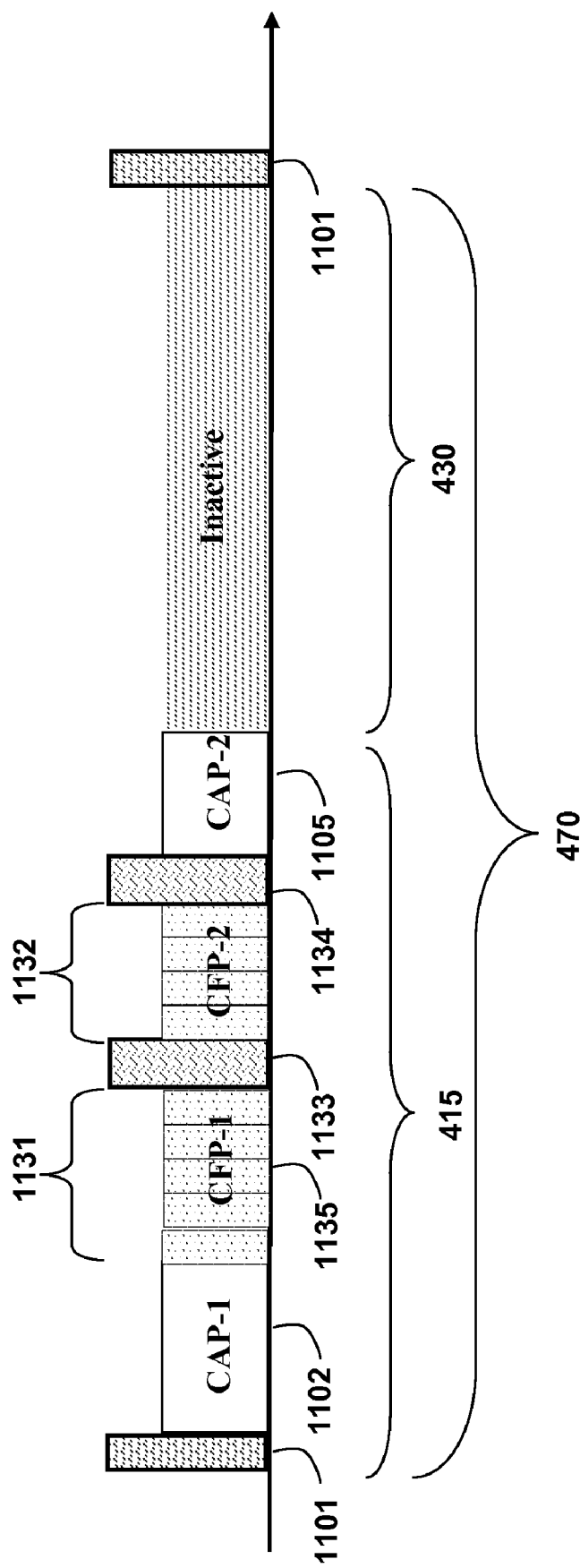
FIGS. 11-12 are block diagrams of superframes with extended contention free periods according to embodiments of the invention.
Figure 12:
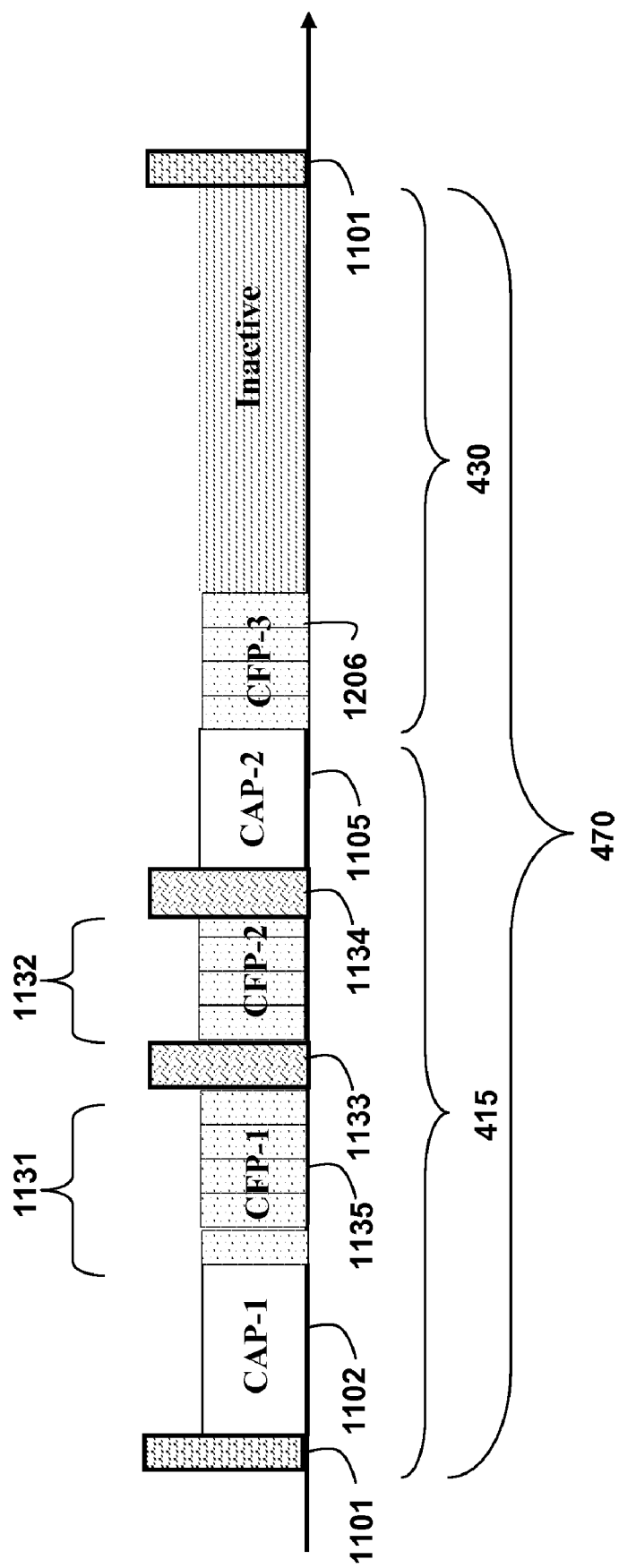

As shown in FIGS. 11 and 12, the superframe 470 includes a beacon 1101 that define the active 415 and the inactive period 430. The active period includes a first contention access period (CAP-1) 1102, a first contention free period (CFP-1) 1131, a first group acknowledgement (GACK-1) 1133, a second contention free period (CFP-2), a second group acknowledgement (GACK-2), and a second contention access period (CAP-2) 11 1105. The CFP-1, GACK-1, CFP-2, and GACK-2 collectively form a comprehensive contention free period (CCFP-2). The second CCFP2 is optional.

Each CFP includes a variable number of guaranteed time slots (GTS) 1135. The first GACK-1 1133 indicates which GTS transmissions in CFP-1 failed or succeeded. This field is optional. The second CFP-2 1132 provides guaranteed time slots for failed frames in CFP-1 for retransmission. This is optional. The GACK-2 1134 indicates which GTS transmissions in the CFP-2 failed or succeeded. This also is optional. A third optional CFP-3 1206 after the CAP-2 can also be included for increased reliability.

The above describe structure resolves backward compatibility issue, while offering highly efficient and reliable performance.

A conventional node receives a beacon, and determines the starting point in time of the CAP and the CFP, which are the CAP-1 and CFP-1 in our structure, and uses these two periods as specified in the current IEEE 802.15.4 standard.

Conventional nodes ignore GACK-1, CFP-2, GACK-2, CAP-2, and CCFP-2 considering that they belief that their inactive period starts immediately after the CFP, i.e., moment when GACK starts. For the nodes that are compliant to the structure as described herein, all of the CAP1, CFP1, GACK, CFP2, GACK2, CAP2, and CCFP2 make sense and are utilized to improve the system performance. These nodes have a relatively shorter inactive period.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for communicating in a network including a coordinator node and a set of leaf nodes, comprising:

transmitting periodically, from the coordinator node to the set of leaf nodes a beacon defining a superframe, wherein the superframe includes an active period and an inactive period following the active period, and wherein the active period includes a first contention access period (CAP-1), a first contention free period (CFP-1) following the CAP-1, a first group acknowledgement (GACK-1) following the CFP-1, a second CFP-2 following the GACK-1, a second GACK-2 following the CFP-2, and a second CAP-2 following the GACK-2, and wherein each CFP includes a guaranteed time slot (GTS) assigned to each leaf node; transmitting, by each leaf node to the coordinator node, only during the GTS assigned to the leaf node during each CFP;

partitioning the inactive interval of the superframe into inactive time slots, wherein each inactive time slot includes a main interval and a guard interval;

wherein for transmission during the CFP-1, the first group acknowledgement message is transmitted at the end of the CFP-1;

wherein all acknowledgements are sent simultaneously as group, wherein the GACK is able to serve as an auxiliary beacon for subsequent retransmission; if a retransmission of data fails during the CFP-1, the data are retransmitted during the second CFP-2 using different frequency which is indicated by the GACK;

and wherein the superframe active interval comprises multiples of comprehensive CFP intervals.

2. The method of claim 1, wherein the GACK-1 indicates which transmissions in the GTS failed or succeeded in the CFP-1, and the GACK-2 indicates which transmissions in the GTS failed or succeeded in the CFP-2.

3. The method of claim 2, wherein the CFP-2 provides GTS for the transmissions that failed.

4. The method of claim 2, wherein the CFP-2 provides the GTS for alarm messages when there is failed transmission in the CFP-1.

5. The method of claim 1, wherein the active period further includes a third CFP-3 following the CAP-2 and a third GACK-3 following the CFP-3.

6. The method of claim 1, wherein the period of beacon transmissions is equal to an integer multiple of super frame interval.

7. The method of claim 1, wherein the super frame active interval comprises multiples of CAP intervals.

* * * * *